July 7, 1931.  T. G. NYBORG  1,813,311
CONVEYER BELT
Filed Jan. 7, 1930
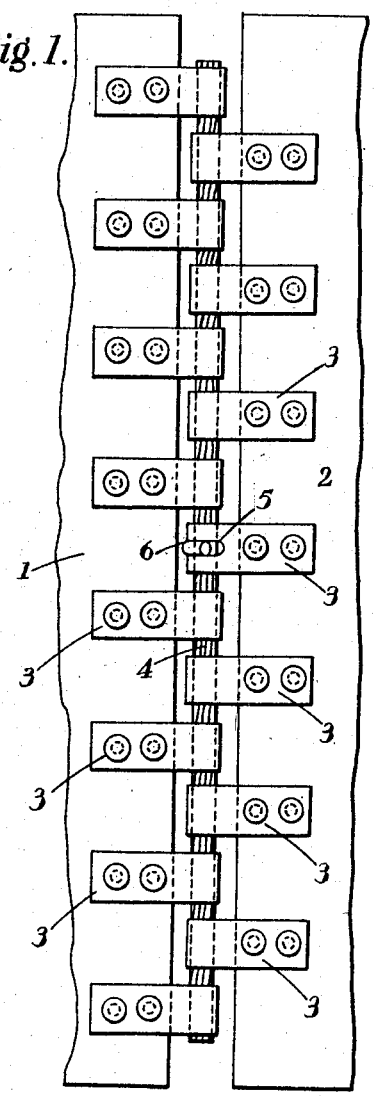
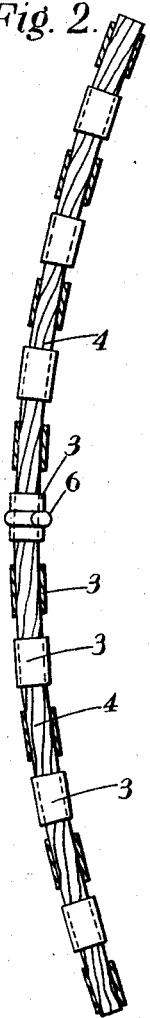
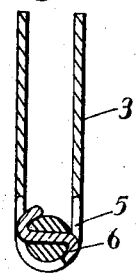
INVENTOR
T. G. NYBORG
BY
ATTORNEY Patented July 7, 1931

1,813,311

UNITED STATES PATENT OFFICE

TAGE GEORG NYBORG, OF WORCESTER, ENGLAND, ASSIGNOR OF ONE-HALF TO MARK FREDERICK HIGGINS, OF WORCESTER, ENGLAND

CONVEYER BELT

Application filed January 7, 1930, Serial No. 419,129, and in Great Britain January 11, 1929.

This invention relates to belt fastenings, and is more particularly intended for use in connection with conveyer belts employed with troughed idler rollers.

In this connection difficulty has been experienced in the past to provide a belt fastening which shall be easily detachable for extending or shortening the belt, and at the same time will afford sufficient flexibility to accommodate the belt to the troughed outline.

In accordance with the invention, the ends of the belt are each provided with a sufficient number of inter-fitting hinge-straps which are inter-connected by means of a length of wire rope serving as the hinge pin.

According to a further feature of the invention, the wire rope is adapted to be held in position by a single locking means situated intermediate its ends.

The invention is illustrated by the accompanying drawings, wherein:—

Fig. 1 is a plan,

Fig. 2 is a part-sectional view showing the fastening in position, and

Fig. 3 is an enlarged detail cross sectional view showing the means for holding the flexible pin in relation with the hinges.

As shown the adjacent belt ends 1 and 2 are provided with a number of U-shaped straps 3, 3 suitably fastened in position to inter-fit with one another with sufficient clearance for the belt to take its troughed formation. The wire rope 4 forming the hinge pin passes through the straps and is suitably secured against endwise movement. It will be seen that one of the hinge straps is slotted at 5 and a locking pin 6 comprising a small length of ordinary iron wire is driven through the rope within the slot, its ends being bent round to an S or C shape. The wire chosen is preferably of a thickness not greater than that of the metal of the hinge strap so that the bent over ends lie flush within the slot.

Preferably the strands of the wire rope are soldered together at the ends to prevent fraying, and also in the middle where the locking pin is received between abutments formed on one of the members traversed by the pin or by two adjacent members. Nevertheless, the invention of utilizing wire rope as a hinge pin is not limited to combination with a single locking pin, as in certain cases, for example, two locking pins of the kind described may be utilized or abutments may be positioned at its ends. It will be realized that the use of a flexible hinge pin is advantageous in connection with troughed conveyer apparatus, and that the improved method of locking a flexible hinge pin is advantageous and provides a quick and easy method of enabling the hinge to be dismantled and set up again in case of need.

I claim:

1. A belt fastening comprising hinge members at the belt ends and a flexible hinge pin of wire rope together with a locking member passing through the hinge pin and engaging a hinge member.

2. A belt fastener comprising hinge members at the belt ends, a flexible wire rope passing through the members to provide an interconnecting hinge for the belt ends, means to strengthen the ends of the wire rope forming the hinge pin, and means passing through the wire rope at one of the hinge members to interlock the rope and hinge member, said means being maintained flush with the surface of the hinge member.

3. A belt fastening for connecting the meeting ends of belts including hinge members secured to the respective ends of the belt and interfitting with such relative spacing as to permit a trough formation of the belt ends without interference through contact with the hinge members, a flexible hinge pin connecting all said hinge members and providing a substantial length of flexible hinge pin between adjacent hinge members, and means on the flexible hinge pin and passing through one of the hinge members remote from the respective end hinge members to prevent relative endwise movement of said flexible hinge pin.

In testimony whereof I affix my signature.

TAGE GEORG NYBORG.